United States Patent
Yang et al.

(10) Patent No.: US 12,068,708 B2
(45) Date of Patent: Aug. 20, 2024

(54) ELECTRIC POWER TOOL

(71) Applicant: Nanjing Chervon Industry Co., Ltd., Nanjing (CN)

(72) Inventors: Dezhong Yang, Nanjing (CN); Chao Xian, Nanjing (CN); QingXiao Mei, Nanjing (CN); Yuwei Yang, Nanjing (CN); Tianxiao Xu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 483 days.

(21) Appl. No.: 16/726,378

(22) Filed: Dec. 24, 2019

(65) Prior Publication Data
US 2020/0228044 A1    Jul. 16, 2020

(30) Foreign Application Priority Data

Jan. 10, 2019  (CN) .......................... 201910021260.X
Jan. 18, 2019  (CN) .......................... 201910048518.5

(51) Int. Cl.
*H02P 29/02* (2016.01)
*H02J 7/00* (2006.01)
*H02P 27/06* (2006.01)
*H02P 29/024* (2016.01)

(52) U.S. Cl.
CPC .......... *H02P 29/024* (2013.01); *H02J 7/0068* (2013.01); *H02P 27/06* (2013.01)

(58) Field of Classification Search
CPC ....... H02P 27/06; H02P 29/024; H02H 9/004; H02J 7/0068

USPC ......................................................... 318/139
See application file for complete search history.

(56) References Cited

U.S. PATENT DOCUMENTS

| | | | | |
|---|---|---|---|---|
| 2003/0214270 | A1* | 11/2003 | Shiue ................. | H03K 3/53 320/166 |
| 2008/0042607 | A1* | 2/2008 | Miyazaki ................. | H02P 3/08 318/504 |
| 2014/0042981 | A1* | 2/2014 | Kaizo ............... | H02J 7/007182 320/136 |
| 2015/0196987 | A1* | 7/2015 | Hayashi ................. | B25F 5/021 173/46 |
| 2015/0303856 | A1* | 10/2015 | Lan .......................... | H02P 27/04 318/494 |
| 2019/0381649 | A1* | 12/2019 | Peng ................... | B27B 17/00 |
| 2020/0228044 | A1* | 7/2020 | Yang ..................... | H02H 9/004 |

* cited by examiner

*Primary Examiner* — Gabriel Agared
(74) *Attorney, Agent, or Firm* — Greenberg Traurig, LLP

(57) ABSTRACT

An electric power tool includes: a motor; a driving circuit configured to drive the motor to output motive power; a control module configured to control the driving circuit; an energy storage element connected to the driving circuit; a current limiting element connected in series with the energy storage element and configured to charge the energy storage element with a first current; a switching element electrically connected in series with the energy storage element, connected in parallel with the current limiting element, and configured to charge or discharge the energy storage element with a second current. The electric power tool can avoid the occurrence of adverse situations such as generating electric sparks at the connection terminals of the electric power tool and of a battery pack when the battery pack is inserted into the electric power tool.

19 Claims, 5 Drawing Sheets

ELECTRIC POWER TOOL

RELATED APPLICATION INFORMATION

The present application claims the benefit of Chinese Patent Application No. 201910021260.X, filed on Jan. 10, 2019, and Chinese Patent Application No. 201910048518.5, filed on Jan. 18, 2019, the disclosures of which are incorporated herein in their entirety by reference.

TECHNICAL FIELD

The following relates to an electric power tool.

BACKGROUND

The motor control system of an electric power tool generally includes a large-capacity capacitor. When a battery pack is mounted to the electric power tool and when a voltage across ends of the capacitor is low, the battery pack charges the capacitor and a large current is generated at the moment of charging. During this process, electric sparks can be generated between the connection terminals of the electric power tool and the connection terminals of the battery pack and the connection terminals can be damaged.

SUMMARY

In order to solve the shortcomings of the existing art, the following describes an electric power tool that can avoid electric sparks at the connection terminals.

By way of example, the following describes an electric power tool that is powered by a battery pack that is detachably mounted to the electric power tool. The electric power tool includes: a motor; a driving circuit configured to drive the motor to output motive power; a control module configured to control the driving circuit; an energy storage element connected to the driving circuit; a current limiting element, connected in series with the energy storage element, configured to charge the energy storage element with a first current; and a switching element, electrically connected in series with the energy storage element and connected in parallel with the current limiting element, configured to charge or discharge the energy storage element with a second current.

Optionally, the control module is configured to control the switching element to be turned on for making the current limiting element short-circuited after the energy storage element is charged with the first current through the current limiting element to a preset voltage threshold.

Optionally, the preset voltage threshold is equal to or substantially equal to a voltage value of the battery pack.

Optionally, the control module is configured to control the switching element to be turned on for making the current limiting element short-circuited after the energy storage element is charged with the first current through the current limiting element to a preset electric quantity threshold.

Optionally, a ratio of the preset electric quantity threshold to a full electric quantity of the energy storage element ranges from 0.7 to 1.

Optionally, the control module is configured to control the switching element to be turned on for making the current limiting element short-circuited after the energy storage element is charged with the first current through the current limiting element for a preset duration of time.

Optionally, the switching element is a relay switch.

Optionally, the switching element is a semiconductor switch.

Optionally, the switching element is a field effect transistor.

Optionally, a value of the first current ranges from 20 mA to 1500 mA.

Optionally, the first current flows between the energy storage element and the battery pack and the second current flows between the energy storage element and the driving circuit.

Optionally, the battery pack includes: a cell group, which includes a plurality of electrically connected cells; a positive power supply terminal, which is connected to a positive electrode of the cell group; and a negative power supply terminal, which is connected to a negative electrode of the cell group.

Optionally, the electric power tool further includes: a positive connection terminal, which is configured to be connected to the positive power supply terminal of the battery pack; and a negative connection terminal, which is configured to be connected to the negative power supply terminal of the battery pack; where the driving circuit has: a first driving end, which is connected to the positive connection terminal; and a second driving end, which is connected to the negative connection terminal; where the energy storage element is connected to the first driving end or the second driving end.

Optionally, the electric power tool further includes: a trigger mechanism, which is operatively triggered for starting the motor; a signal switch, which is connected to the trigger mechanism in an association manner and is configured to output a starting signal to the control module; where the control module is configured to: after the starting signal outputted by the signal switch is received, output a first control signal to control the switching element to be turned on for making the current limiting element short-circuited.

Optionally, the control module is configured to output a second control signal to the driving circuit for making the motor rotate after the switching element is turned on.

Optionally, the electric power tool further includes a first voltage detection circuit, which is configured to detect a voltage across two ends of the energy storage element.

Optionally, the electric power tool further includes a second voltage detection circuit, which is configured to detect a voltage of the battery pack.

Also described is an electric power tool that is powered by a battery pack, where the battery pack is detachably mounted to the electric power tool. The electric power tool includes: a motor; a driving circuit configured to drive the motor to output motive power; a control module is configured to control the driving circuit; an energy storage element connected to the driving circuit; and a protection circuit, electrically connected between the energy storage element and the driving circuit, that includes a first circuit and a second circuit arranged in parallel. The first circuit is connected to the energy storage element and is configured to charge the energy storage element with a first current. The second circuit is connected to the energy storage element and is configured to charge or discharge the energy storage element with a second current.

Optionally, the first circuit includes a current limiting element, and the current limiting element is connected in series with the energy storage element; the second circuit includes a switching element, and the switching element is electrically connected in series with the energy storage element and is connected in parallel with the current limiting element.

Optionally, the control module is configured to control the switching element to be turned on for making the current limiting element short-circuited after the energy storage element is charged with the first current through the current limiting element to a preset condition.

The hereinafter described electric power tools have the following beneficial effects: in the initial stage of mounting the battery pack to the electric power tool, the adverse situation that the electric spark is generated at the connection terminals of the electric power tool and the connection terminals of the battery pack due to the fact that a large current is generated at the moment of charging a filter capacitor in the electric power tool can be avoided.

DETAILED DESCRIPTION

Example power tools are described in detail below with reference to the drawings. It can be understood that the specific examples described herein are used to merely explain the construction and/or operation of such power tools are not intended to otherwise limit the invention that is claimed.

It will also be understood that an electric power tool that can utilize the teachings of the subject disclosure includes, but is not limited to the following: a screwdriver, an electric drill, a wrench, an angle grinder and other electric power tools that require speed adjustment; a sander and other electric power tools used for grinding workpieces, a reciprocating saw, a circular saw, a jig saw and other electric power tools used for cutting workpieces; an electric hammer and other electric power tools used for impact. These tools may also be garden-type tools, such as a mower, a snow sweeper, a blow suction machine, a pruner and a chain saw; these tools may also be used for other purposes, such as a mixer. As long as these electric power tools can adopt the substance of the technical solution disclosed below, these electric power tools will fall into the protection scope of the invention claimed.

The following describes an electric power tool that is powered by a battery pack, and the battery pack is detachably mounted to the electric power tool. The electric power tool includes: a tool accessory for implementing the function of the electric power tool; a motor operatively connected to the tool accessory for driving the tool accessory to work.

Figure 1:
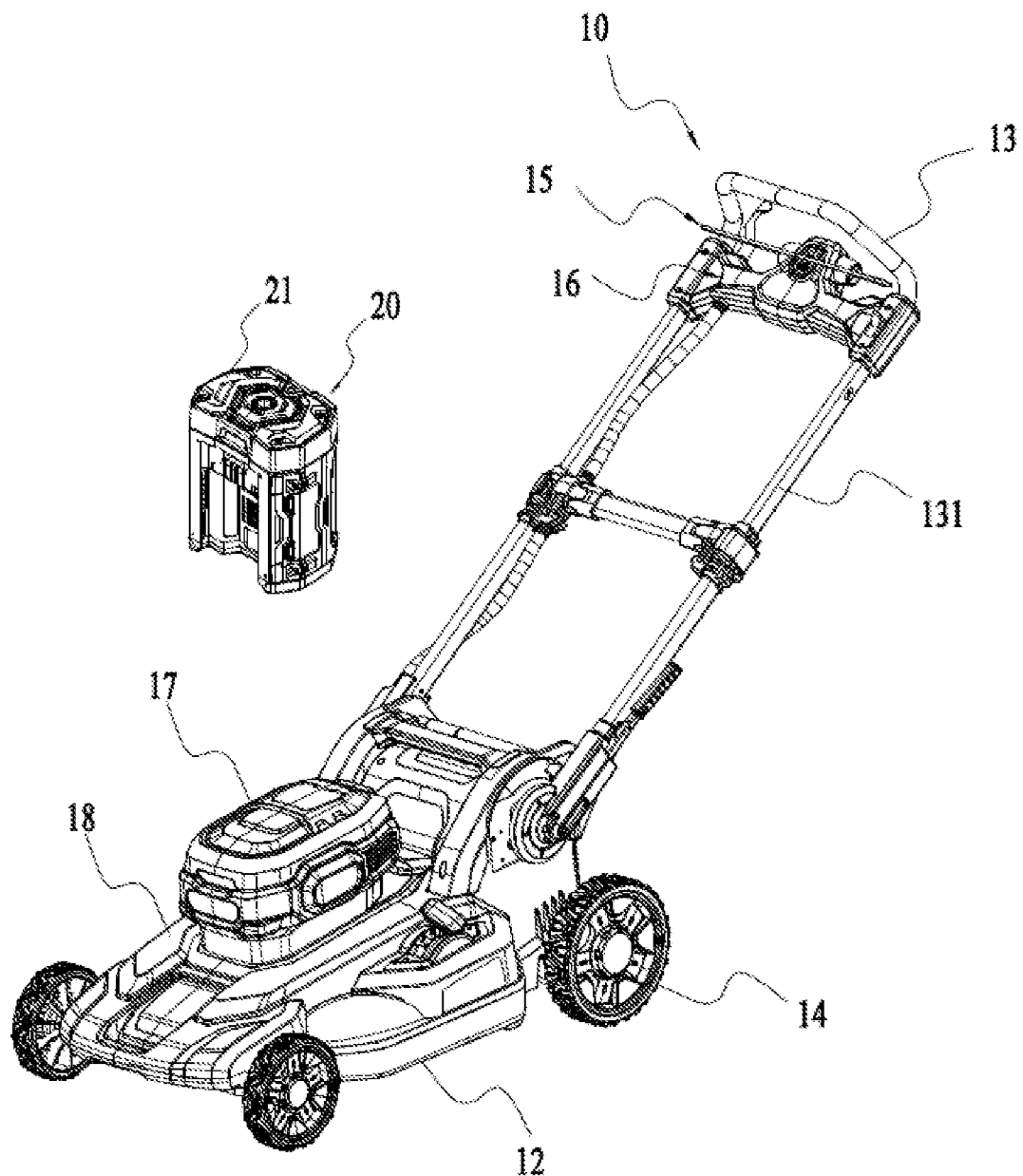
FIG. 1 is a structural diagram of an example electric power tool.

Referring to FIG. 1, an example electric power tool 10 is provided in the form of a mower, and the electric power tool 10 includes: a motor 33, a chassis 12, a handle 13, a wheel 14 and a blade. Certainly, the electric power tool 10 may also be a riding-type mower, or an electric power tool that implements other functions.

The blade is used as a tool accessory of the mower for implementing the mowing function of the mower, and is arranged in the chassis 12.

The motor 33 is operatively connected to the tool accessory for driving the tool accessory to work. For the mower, the tool accessory is a blade, the motor 33 is operatively connected to the blade, and the motor 33 is configured to drive the blade to rotate, thereby implementing the mowing function.

The motor 33 may be directly connected to the blade, or may be connected to the blade through a transmission device or a speed reduction mechanism to drive the blade.

The chassis 12 is configured to carry and mount the motor 33. The chassis 12 is formed with a cutting cavity (not shown). The blade rotates in the cutting cavity. The motor 33 may be a motor 33 by using electricity as the motive power or an internal combustion engine by using fuel combustion as the motive power. Specifically, the motor 33 is a brushless motor. In the embodiment, the electric power tool 10 is powered by the battery pack 20. The mower is provided with a battery compartment 17 for accommodating the battery pack 20, and the battery compartment 17 is provided on the upper part of the chassis 12.

The handle 13 is held by a user to operate the electric power tool 10. For the mower, the handle 13 is configured to push the mower. The handle 13 is connected to the chassis 12. For a hand mower, a connecting rod 131 is further included. The connecting rod 131 connects the handle 13 and the chassis 12. Optionally, the handle 13 and the connecting rod 131 may be formed as one part. Optionally, the mower further includes a trigger 15 and a switch box 16, and the trigger 15 is configured to control the motor 33. The trigger 15 is rotatably connected to the switch box 16, and the switch box 16 is fixed to the handle 13 or the connecting rod 131.

The wheels 14 rotate relative to the chassis 12, enabling the mower to move on the ground. Optionally, the mower includes a self-propelled motor, and the self-propelled motor drives the wheels 14 to rotate.

As mentioned above, the electric power tool 10 is not limited to the above-mentioned mower, and may also be another electric power tool, for example, may be a garden-type electric power tool such as a riding-type mower, a snow sweeper, a blow suction machine, a pruner and a chain saw, may also be a hand-held electric power tool such as a reciprocating saw, a circular saw, a jig saw, a circular saw, an angle grinder, an electric drill, a screwdriver and a wrench, and may also be a bench-type tool.

Referring to FIGS. 2 to 5, the operation of the electric power tool 10 also depends on a circuit system 30, the circuit system 30 includes circuit components, at least a part of the circuit components are arranged on a circuit board, and the circuit board is arranged in a casing 18 of the electric power tool. The circuit system 30 of the electric power tool 10 mainly includes: a control module 31, a driving circuit 32, a motor 33, an energy storage element 34, and a battery pack 20.

The battery pack 20 includes a casing 21 (FIG. 1) and a cell group 22 accommodated in the casing 21. The cell group 22 includes a plurality of electrically connected cells 221, the cells 221 can be charged repeatedly, and the plurality of cells 221 are electrically connected to form the cell group 22. The battery pack 20 further includes power supply terminals for connection with connection terminals of the electric power tool 10. The connection terminals of the battery pack 20 include a positive power supply terminal B+ and a negative power supply terminal B−, and the positive power supply terminal B+ and the negative power supply terminal B− are electrically connected to the positive electrode and the negative electrode of the cell group 22, respectively. The connection terminals of the electric power tool 10 include a positive connection terminal T+ and a negative connection terminal T−, and the positive connection terminal T+ and the negative connection terminal T− are respectively connected to the positive power supply terminal B+ and the negative power supply terminal B− of the battery pack 20 to transmit electric energy. When the battery pack 20 is mounted to the electric power tool 10, the positive power supply terminal B+ and the negative power supply terminal B− of the battery pack 20 are electrically connected to the positive connection terminal T+ and the negative connection terminal T− of the electric power tool 10, respectively, so as to transmit electric energy.

Figure 2:
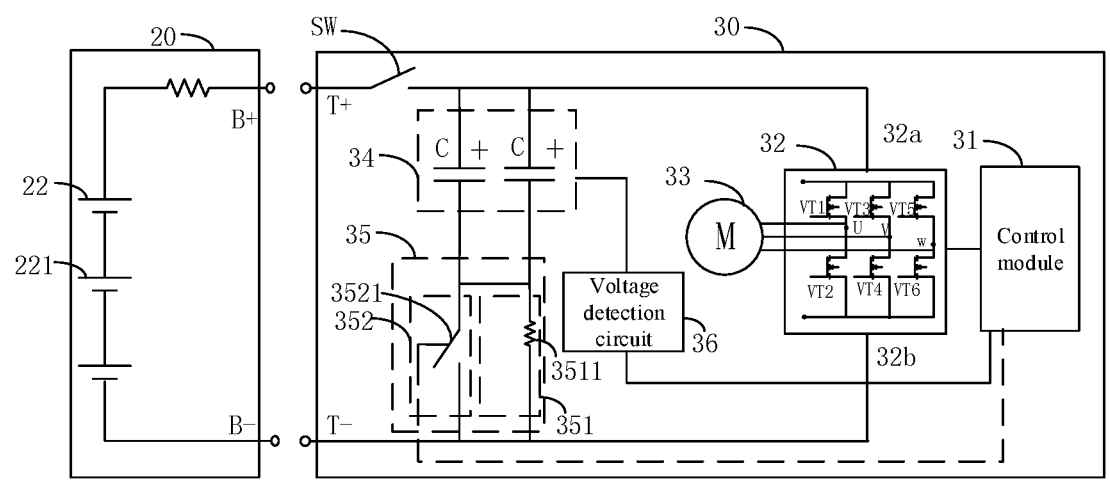
FIG. 2 is a circuit system diagram of an example electric power tool.

In the illustrated example, the electric power tool 10 includes a current switch SW (FIG. 2). The current switch SW is arranged in the switch box 16, the current switch SW is connected to the trigger 15, and the current switch SW can be triggered by the trigger 15 so that the on-off state of the current switch SW is changed. The current switch SW is connected in series in the electric energy transmission electric circuit between the battery pack 20 and the electric power tool 10, and is configured to allow or prohibit a flow of current from the battery pack 20. Specifically, one end of the current switch SW is connected to the positive connection terminal T+ of the electric power tool 10, and the other end of the current switch SW is connected to the driving circuit 32, the energy storage element 34, and the control module 31. In another example, the electric power tool 10 does not include the current switch SW, but adopts a signal switch K (FIG. 3) to trigger the control module 31, so that the control module 31 outputs a signal to the driving circuit 32, thereby controlling the driving circuit 32 to work. The signal switch K is connected to the trigger 15, and the signal switch K is triggered by the trigger 15 so that the on-off state of the signal switch K is changed. The signal switch K is electrically connected to the control module 31 and is used for outputting a starting signal to the control module 31. Specifically, the control module 31 can detect the state of the signal switch K. When the signal switch K is in a triggered state, a starting signal is outputted to the control module 31, and the control module 31 outputs a control signal to the driving circuit 32 for making the driving circuit 32 work. In the present embodiment, as a trigger mechanism, the trigger 15 is operatively triggered for starting the electric power tool 10 or the motor 33.

The control module 31 is electrically connected to the driving circuit 32, and is configured to output a driving signal to control the driving circuit 32 to work. The control module 31 may be a dedicated control chip (for example, a Microcontroller Unit (MCU)). Optionally, the control chip may internally include a power driving module configured to improve the driving capability of the output signal of the control module 31, and the power driving module may also be implemented by using an external power driving module. The electric power tool 10 further includes a power supply module configured to convert the electric energy of the battery pack 20 into the electric energy available for the control chip or other electronic components in the control module 31.

The driving circuit 32 is connected to the motor 33, and is configured to drive the motor 33 to output motive power. In an embodiment, the motor 33 is a brushless direct current motor, and the motor 33 includes a rotor, a stator, and a winding. The driving circuit 32 is specifically connected to the winding of the motor 33 through the three-phase electrodes U, V, and W of the motor 33. The driving circuit 32 specifically includes at least one switching element, which is configured to change the on-off state according to the control signal of the control module 31, thereby changing the energized state of the winding of the motor 33.

As an example, the driving circuit 32 is a three-phase bridge circuit, the driving circuit 32 includes switching elements VT1, VT2, VT3, VT4, VT5, and VT6, and the switching elements VT1, VT2, VT3, VT4, VT5, and VT6 form a three-phase bridge, where switching elements VT1, VT3, and VT5 are upper-bridge driving switches, and switching elements VT2, VT4, and VT6 are lower-bridge driving switches. Field effect transistors, insulated gate bipolar transistors (IGBTs), and the like may be used as the switching elements VT1 to VT6 The field effect transistor is taken as an example, a gate end of each switching element is electrically connected to the power driving circuit 211 of the control module 31, and the drain or the source of each switching element is electrically connected to the winding of the motor 33. The on-off states of the switching elements VT1 to VT6 are changed according to the driving signal outputted by the control module 31, and thereby a state of the voltage applied by the battery pack 20 to the winding of the motor 33 is changed, and the motor 33 is driven to run.

In order to make the motor 33 rotate, the driving circuit 32 has multiple driving states. In one driving state, a stator winding of the motor generates a magnetic field, the control module 31 is configured to output a corresponding driving signal to the driving circuit 32 according to a rotation position of the rotor of the motor 33, so as to make the driving circuit 32 switch the driving state, thereby changing the state of the voltage applied to the winding of the motor 33, generating an alternating magnetic field to drive the rotor to rotate, and thereby implementing the driving of the motor. The rotation position of the rotor of the motor 33 may be obtained through detection by a position sensor, and may also be obtained through a corresponding calculation of a busbar current of a sampling motor and/or an end voltage of the motor.

The driving circuit 32 has a first driving end 32a and a second driving end 32b, where the first driving end 32a is connected to the positive connection terminal T+, and the second driving end 32b is connected to the negative connection terminal T−.

The energy storage element 34 is connected to the driving circuit 32, and is configured to filter the driving circuit 32. Specifically, the energy storage element 34 is connected to the first driving end 32a or the second driving end 32b. The energy storage element 34 includes at least one electrolytic capacitor C, that is, the energy storage element 34 may include one electrolytic capacitor C, or may include a plurality of electrolytic capacitors C connected in parallel.

In the initial stage of mounting the battery pack 20 to the electric power tool 10, a voltage across two ends of the electrolytic capacitor C is low, the battery pack 20 charges the electrolytic capacitor C, the voltage difference between the battery pack 20 and the electrolytic capacitor C is large, and a large current is generated at the moment of charging the electrolytic capacitor C, so that an electric spark may be generated between the connection terminals of the electric power tool 10 and the connection terminals of the battery pack 20. If the electric power tool 10 is provided with a power supply switch SW (FIG. 1) connected to the positive power supply terminal T+ of the battery pack 20, the electrolytic capacitor C is connected behind the power supply switch SW, and when the power supply switch SW is closed, a large current may cause ablation or adhesion of the contacts of the power supply switch SW.

The electric power tool 10 further includes a protection circuit 35, and the protection circuit 35 is electrically connected between the energy storage element 34 and the driving circuit 32. The protection circuit 35 includes a first circuit 351 and a second circuit 352 arranged in parallel. The first circuit 351 is connected to the energy storage element 34 and is configured to charge the energy storage element 34 with a first current; the second circuit 352 is connected to the energy storage element 34 and is configured to charge or discharge the energy storage element 34 with a second current.

Specifically, the first circuit 351 includes a current limiting element 3511. The current limiting element 3511 is connected in series with the energy storage element 34. The energy storage element 34 can be charged with the first current through the current limiting element 3511, and the current limiting element 3511 is connected in series in the charging circuit of the energy storage element 34. The first current flows between the energy storage element 34 and the battery pack 20.

In the example illustrated in FIG. 2, the electric power tool 10 includes a current switch SW. After the battery pack 20 is mounted to the electric power tool 10 and the current switch SW is turned on, the battery pack 20 charges the energy storage element 34 with the first current through the current limiting element 3511.

Figure 3:
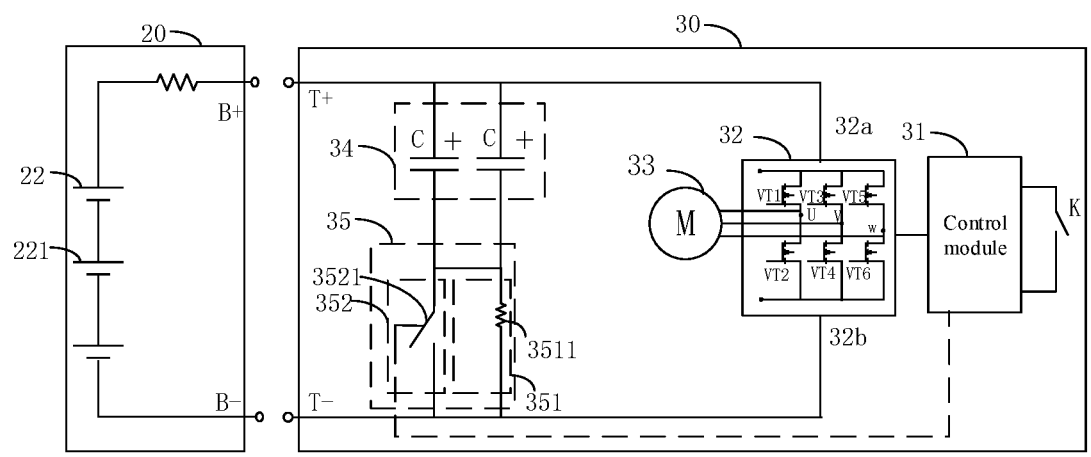
FIG. 3 is a circuit system diagram of another example electric power tool.

In the example illustrated in FIG. 3, the electric power tool 10 does not include a current switch SW, but includes a signal switch K. After the battery pack 20 is mounted to the electric power tool 10, the battery pack 20 charges the energy storage element 34 with the first current through the current limiting element 3511. The current limiting element 3511 may specifically be a resistor R.

Figure 4:
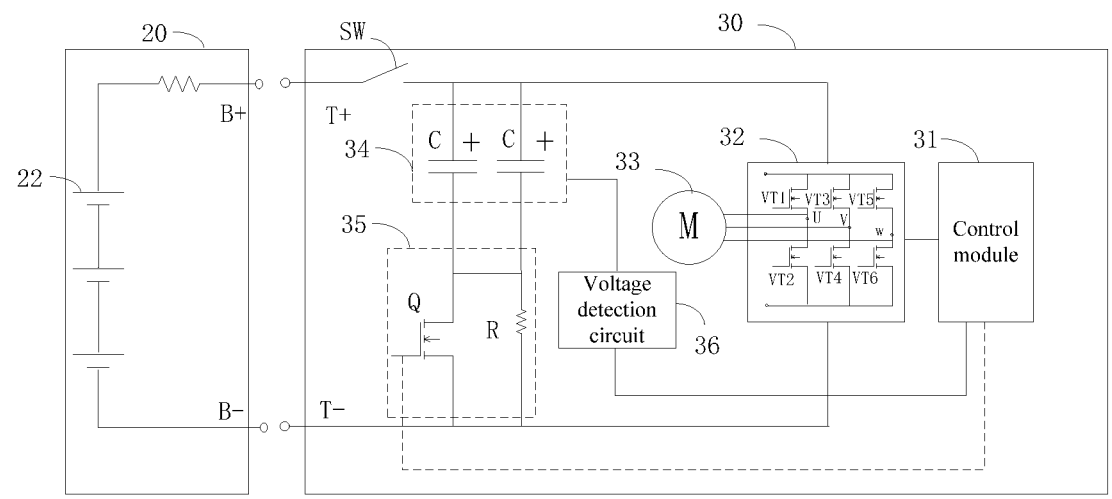
FIG. 4 is a circuit system diagram of another example electric power tool.
Figure 5:
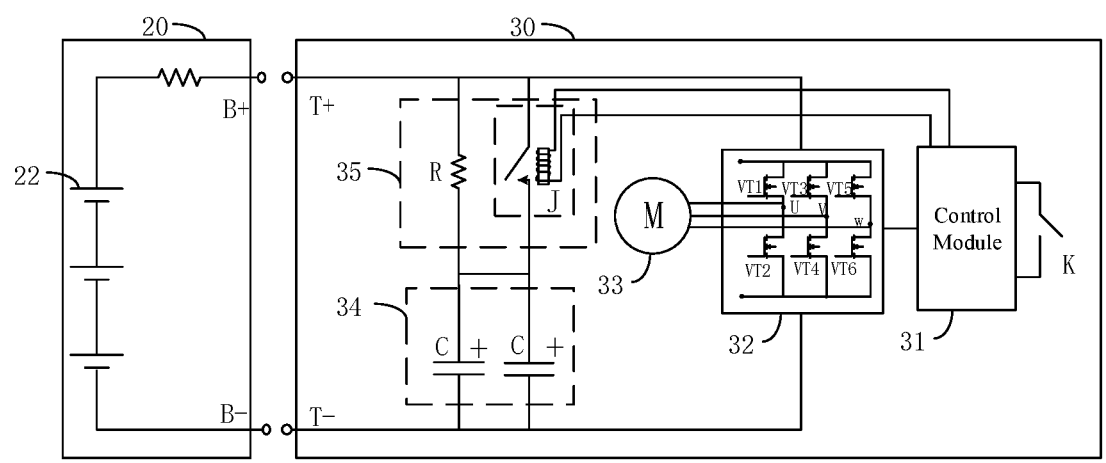
FIG. 5 is a circuit system diagram of another example electric power tool.

The second circuit 352 includes a switching element 3521. The switching element 3521 is connected in series with the energy storage element 34, is connected in parallel with the current limiting element 3511, and is configured to charge or discharge the energy storage element 34 with a second current. The second current flows between the energy storage element 34 and the driving circuit 32. The switching element 3521 may be a semiconductor switch (as shown in FIG. 4) or a relay switch (as shown in FIG. 5).

The control module 31 is configured to control the switching element 3521 to be turned on for making the current limiting element short-circuited after the energy storage element 34 is charged with the first current through the current limiting element 3511 to a preset condition.

In this way, after the energy storage element 34 is charged with the first current to meet the preset condition, the energy storage element 34 may be directly connected in parallel to the driving circuit 32, and is configured to filter the driving circuit 32. After the driving circuit 32 works, the energy storage element 34 is charged or discharged with a second current, and the second current flows between the energy storage element 34 and the driving circuit 32, so that the energy storage element 34 can filter the driving circuit 32.

The value of the first current may range from 20 mA to 1500 mA. That is, after the battery pack 20 is mounted to the electric power tool 10, firstly the energy storage element 34 is charged with a small current, which can avoid generation of the electric spark at connection terminals of the electric power tool 10 and connection terminals of the battery pack 20 due to the fact that a large current is generated at the moment of charging an electrolytic capacitor C. When the electrolytic capacitor C is charged to meet a preset condition, the switching element 3521 is turned on for making the current limiting element 3511 short-circuit, so that the energy storage element 34 can be directly connected in parallel with the driving circuit 32, for filtering the driving circuit 32 normally, without letting the current limiting element 3511 continue to consume the electric power of the battery pack 20.

Specifically, in the initial stage of mounting the battery pack 20 to the electric power tool 10, the positive power supply terminal B+ and the negative power supply terminal B− of the battery pack 20 are connected to the positive connection terminal T+ and the negative connection terminal T− of the electric power tool 10, respectively. The energy storage element 34 is charged through the current limiting element 3511 firstly, and after the energy storage element 34 is charged to meet a preset condition, the control module 31 outputs a control signal to control the switching element 3521 to be turned on for making the current limiting element 3511 short-circuit, and the energy storage element 34 and the driving circuit 32 are connected in parallel. When the driving circuit 32 works, the energy storage element filters the driving circuit 32, and at this time, the energy storage element 34 is charged or discharged with the second current.

It will also be understood that the control module 31 may be configured to control the switching element 3521 to be turned on for making the current limiting element short-circuited after the energy storage element 34 is charged with the first current through the current limiting element 3511 to reach a preset voltage threshold.

The preset voltage threshold may be equal to or substantially equal to the voltage value of the battery pack 20. In this way, when the voltage difference between the energy storage element 34 and the battery pack 20 is small or zero, the energy storage element 34 and the driving circuit 32 are then connected in parallel, so that the energy storage element 34 can normally filter the driving circuit 32.

Referring to FIGS. 2 and 4, the electric power tool 10 may include a first voltage detection circuit 36, which is configured to detect a voltage across two ends of the energy storage element 34. That is, the first voltage detection circuit 36 detects whether the energy storage element 34 reaches a preset voltage threshold. When the first voltage detection circuit 36 detects that the voltage of the energy storage element 34 reaches the preset voltage threshold, the control module 31 is triggered to output a control signal to the switching element 3521, the switching element 3521 is turned on and then the current limiting element 3511 is made short-circuit, so that the energy storage element 34 can be directly connected in parallel to two ends of the driving circuit 32 for filtering the driving circuit 32.

The electric power tool 10 may include a second voltage detection unit for detecting a voltage of the battery pack 20.

It will be further understood that the control module 31 may be configured to control the switching element 3521 to be turned on for making the current limiting element 3511 short-circuited after the energy storage element 34 is charged with the first current through the current limiting element 3511 to reach a preset power threshold. A ratio of the preset electric quantity threshold to the full electric quantity of the energy storage element 34 may range from 0.7 to 1.

Still further, the control module 31 may be configured to control the switching element 3521 to be turned on for making the current limiting element 3511 short-circuited after the energy storage element 34 is charged with the first current through the current limiting element 3511 for a preset duration.

Referring to FIG. 4, in a specific example, the switching element 3521 is a semiconductor switch Q1, and the current limiting element 3511 is a resistor R. The semiconductor switch Q1 is, for example, a field effect transistor or a bipolar transistor. The field effect transistor is taken as an example, the gate of the field effect transistor is electrically connected to the control module 31, and the other two electrodes of the field effect transistor are connected in parallel with the resistor R and then connected in series with the energy storage element 34. After the energy storage element 34 is charged with the first current to meet the preset condition, the control module 31 outputs a control signal to control the semiconductor switch Q1 to be turned on, thereby making the resistor R short-circuit, so that the energy storage element 34 is directly connected in parallel to the two ends of the driving circuit 32 for filtering the driving circuit 32.

Referring to FIG. 5, in another specific example, the switching element 351 is a relay J, and a control coil of the relay J is electrically connected to the control module 31. Specifically, the control coil of the relay J is electrically connected to a power supply module (not shown) in the control module 31, the control module 31 can control the energized state of the control coil of the relay J by controlling an electronic switch (not shown). After the energy storage element 34 is charged with the first current to meet the preset condition, the control module 31 outputs a control signal to control the control coil of the relay J to be energized, thereby making the resistor R short-circuit, so that the energy storage element 34 is directly connected in parallel to the two ends of the driving circuit 32 for filtering the driving circuit 32.

Referring to FIGS. 3 and 5, in another example, the user inputs a trigger signal to trigger the control module 31 to output a control signal to the switching element 351, and then the switching element 351 is turned on, making the current limiting element 352 short-circuit, so that the energy storage element 34 can be directly connected in parallel to the two ends of the driving circuit 32 for filtering the driving circuit 32.

This example is based on the structural characteristics of the electric power tool such as a mower. The mounting position of the battery pack 20 is far from the position of an operating mechanism (e.g., a trigger) for starting the electric power tool 10. The duration from the insertion of the battery pack 20 by the user into the mower to the operation of the operating mechanism by the user is much longer than the duration for the energy storage element 34 to be fully charged. When the user operates the operating mechanism, the energy storage element 34 is already fully charged. There is no need to detect the preset time for turning on the battery pack 20 and whether the voltage of the battery pack 20 is equal to the voltage of the energy storage element 34. At this time, if the electric power tool 10 is started, no large current occurs while the capacitor is being charged, and then no electric spark is generated at the connection terminals of the electric power tool 10 and the connection terminals of the battery pack 20s, or no switch contact is damaged.

The electric power tool 10 may therefore include: a trigger mechanism, which is operatively triggered for starting the motor 33 and is, for example, the aforementioned trigger 15; and the signal switch K, which is connected to the trigger mechanism in an association manner and is electrically connected to the control module 31. The signal switch K is triggered by the trigger mechanism so that the on-off state of the signal switch K is changed and is configured to output a starting signal to the control module 31. The control module 31 is configured to output a first control signal to control the switching element 3521 to be turned on for making the current limiting element 3511 short-circuited after the signal switch K outputs the starting signal. In this way, the energy storage element 34 is directly connected in parallel to the two ends of the driving circuit 32 for filtering the driving circuit 32.

After the switching element 3521 is turned on, the control module 31 may output a second control signal to the driving circuit 32 to start the motor 33. That is, after the energy storage element 34 is charged with the first current to meet a preset condition and the switching element 3521 is turned on for making the current limiting element 3511 short-circuited, the driving circuit 32 works so that the energy storage element 34 can filter the driving circuit 32 normally.

Compared with the previous examples, the manner of triggering the control module 31 through the signal switch K to output a control signal to the switching element 351 does not require the voltage detection circuit 36 to detect the voltage across the two ends of the energy storage element 34 and, as such, the circuit design is simpler and the cost is lower.

In this way, in the initial stage of mounting the battery pack 20 to the electric power tool 10, the energy storage element is slowly charged through the current limiting element, which can avoid the generation of electric sparks at the connection terminals of the electric power tool 10 and the connection terminals of the battery pack 20 at the moment of charging the electrolytic capacitor C and avoid the damage to contacts of the switch; and after the electrolytic capacitor C is charged to meet the preset condition, for example, by reaching a preset voltage threshold, a preset electric quantity threshold, or a preset duration, the current limiting element 3511 is made short-circuited so that the electrolytic capacitor C is connected in parallel to the two ends of the driving circuit 32 for filtering the driving circuit 32 normally, without letting the current limiting element 3511 continue to consume the electric power of the battery pack.

The basic principles, main features and advantages of the present invention have been shown and described above. Those skilled in the art should understand that the above embodiments do not limit the invention hereinafter claimed in any form, and that any technical solution obtained by means of equivalent substitution or equivalent transformation falls within the protection scope of the claims.

What is claimed is:

1. An electric power tool, powered by a battery pack that is detachably mounted to the electric power tool, comprising:
   a motor;
   a driving circuit configured to drive the motor to output motive power;
   a control module configured to control the driving circuit;
   an energy storage element connected to the driving circuit;
   a current limiting element, connected in series with the energy storage element, configured to charge the energy storage element with a first current; and
   a switching element, electrically connected in series with the energy storage element and connected in parallel with the current limiting element all in parallel to the motor, configured to charge or discharge the energy storage element with a second current;
   wherein a first end of the energy storage element is connected to a positive pole of a power bus that functions to couple the motor to the battery pack, a second end of the energy storage element is coupled to a first end of the switching element, and a second end of the switching element is coupled to a negative pole of the power bus.

2. The electric power tool of claim 1, wherein the control module is configured to control the switching element to be turned on for making the current limiting element short-circuited after the energy storage element is charged with the first current through the current limiting element to reach a preset voltage threshold.

3. The electric power tool of claim 2, wherein the preset voltage threshold is equal to or substantially equal to a voltage value of the battery pack.

4. The electric power tool of claim 1, wherein the control module is configured to control the switching element to be turned on for making the current limiting element short-circuited after the energy storage element is charged with the first current through the current limiting element to reach a preset electric quantity threshold.

5. The electric power tool of claim 4, wherein a ratio of the preset electric quantity threshold to a full electric quantity of the energy storage element ranges from 0.7 to 1.

6. The electric power tool of claim 1, wherein the control module is configured to control the switching element to be turned on for making the current limiting element short-circuited after the energy storage element is charged with the first current through the current limiting element for a preset duration.

7. The electric power tool of claim 1, wherein the switching element is a relay switch.

8. The electric power tool of claim 1, wherein the switching element is a semiconductor switch.

9. The electric power tool of claim 1, wherein the switching element is a field effect transistor.

10. The electric power tool of claim 1, wherein a value of the first current ranges from 20 mA to 1500 mA.

11. The electric power tool of claim 1, wherein the first current flows between the energy storage element and the battery pack and the second current flows between the energy storage element and the driving circuit.

12. The electric power tool of claim 1, wherein the battery pack comprises a cell group, comprised of a plurality of electrically connected cells, a positive power supply terminal, connected to a positive electrode of the cell group, and a negative power supply terminal, connected to a negative electrode of the cell group.

13. The electric power tool of claim 12, further comprising a positive connection terminal configured to be connected to the positive power supply terminal of the battery pack and a negative connection terminal configured to be connected to the negative power supply terminal of the battery pack, wherein the driving circuit has a first driving end connected to the positive connection terminal and a second driving end connected to the negative connection terminal, and wherein the energy storage element is connected to the first driving end or the second driving end.

14. The electric power tool of claim 1, further comprising a trigger mechanism operatively triggered for starting the motor and a signal switch connected to the trigger mechanism configured to output a starting signal to the control module, wherein the control module is configured to output a first control signal to control the switching element to be turned on for making the current limiting element short-circuited after the starting signal outputted by the signal switch is received.

15. The electric power tool of claim 14, wherein the control module is configured to output a second control signal to the driving circuit for making the motor rotate after the switching element is turned on.

16. The electric power tool of claim 1, further comprising a first voltage detection circuit configured to detect a voltage across two ends of the energy storage element.

17. The electric power tool of claim 1, further comprising a second voltage detection circuit configured to detect a voltage of the battery pack.

18. An electric power tool, powered by a battery pack that is detachably mounted to the electric power tool, comprising:
a motor;
a driving circuit configured to drive the motor to output motive power;
a control module configured to control the driving circuit;
an energy storage element connected to the driving circuit; and
a protection circuit electrically connected between the energy storage element and the driving circuit comprising a first circuit and a second circuit arranged in parallel and all in parallel to the motor;
wherein the first circuit is connected to the energy storage element and is configured to charge the energy storage element with a first current, the second circuit is connected to the energy storage element and is configured to charge or discharge the energy storage element with a second current, a first end of the energy storage element is connected to a positive pole of a power bus that functions to couple the motor to the battery pack, a second end of the energy storage element is coupled to a first end of the switching element, and a second end of the switching element is coupled to a negative pole of the power bus,
wherein the first circuit comprises a current limiting element connected in series with the energy storage element and the second circuit comprises a switching element electrically connected in series with the energy storage element and connected in parallel with the current limiting element.

19. The electric power tool of claim 18, wherein the control module is configured to control the switching element to be turned on to make the current limiting element short-circuited after the energy storage element is charged with the first current through the current limiting element to meet a preset condition.

* * * * *